April 25, 1933.　　J. HOFFMAN ET AL　　1,905,589
MOTOR BARROW
Filed Aug. 24, 1931　　2 Sheets-Sheet 1

Inventor
Joe Hoffman
Hugo Hoffman
By C.A.Snow&Co.
Attorneys.

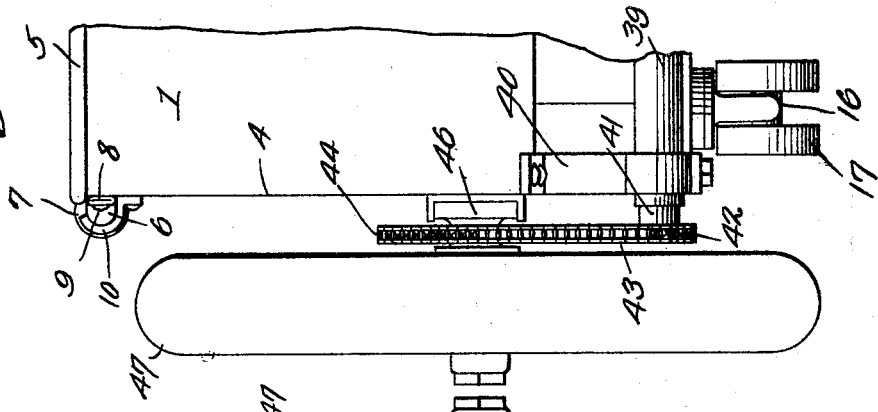
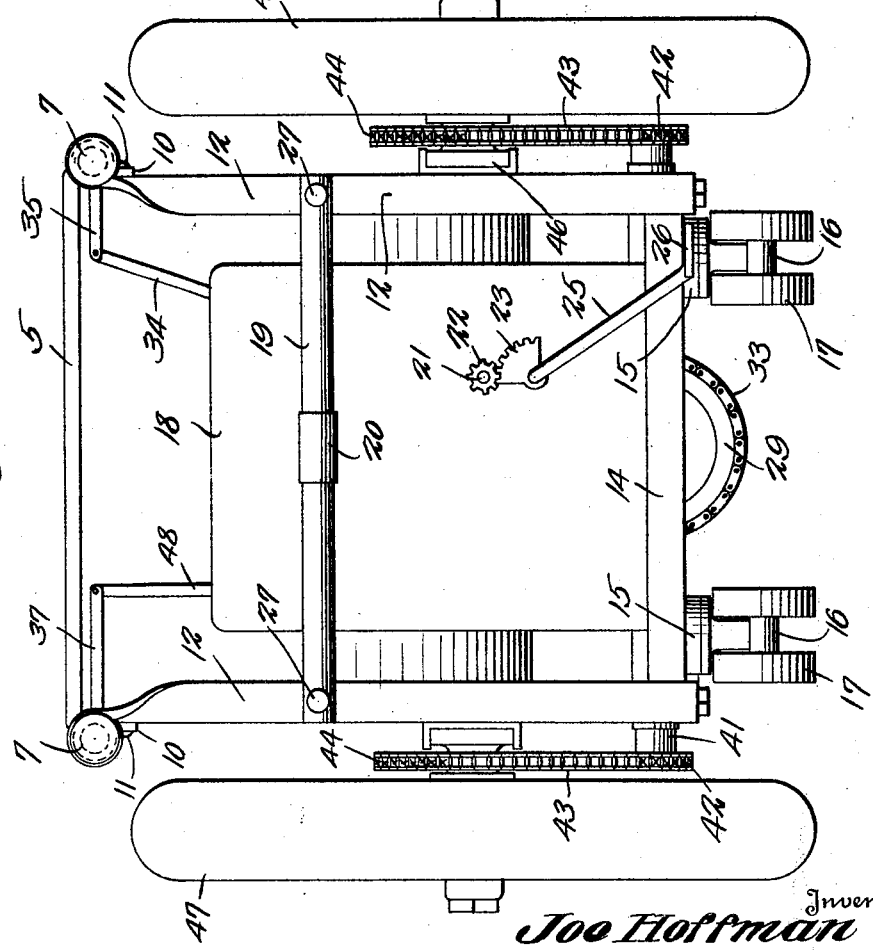

Patented Apr. 25, 1933

1,905,589

UNITED STATES PATENT OFFICE

JOE HOFFMAN AND HUGO HOFFMAN, OF TWO RIVERS, WISCONSIN

MOTOR BARROW

Application filed August 24, 1931. Serial No. 559,074.

This invention aims to provide a novel motor propelled wheel barrow.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 2 is a rear elevation;

Figure 3 is a front elevation wherein parts are broken away.

Figure 1:
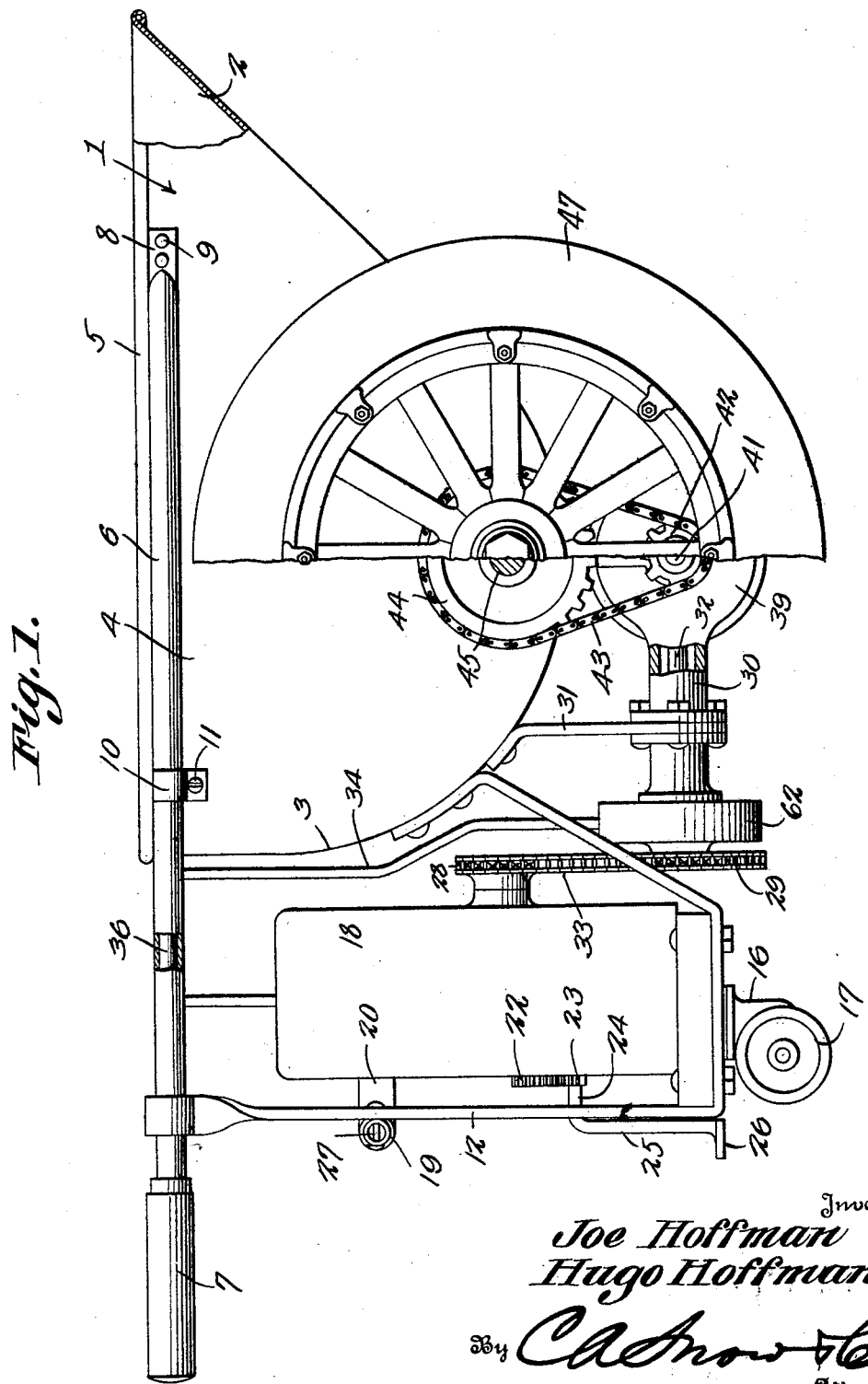
Figure 1 shows in side elevation, a device constructed in accordance with the invention, parts being broken away.

The barrow forming the subject matter of this application comprises a body 1 which may be of any desired shape. As shown in Figure 1, but not of necessity, the body 1 comprises an inclined front wall 2 and a rounded rear wall 3, the walls 2 and 3 merging into the bottom of the body 1. The side walls of the body 1 are marked by the numeral 4. Around the upper edge of the body 1 extends an outstanding bead 5, beneath which, rearwardly extended, parallel handle bars 6 are engaged, the handle bars having flat forward ends 8 connected by securing elements 9 to the side walls 4 of the body 1. The handle bars 6 are engaged, and are held underneath the bead 5, by curved grips 10, attached by securing elements 11 to the side walls 4 of the body 1. Grips 7 are rotatably mounted on the rear ends of the handle bars 6.

With the handle bars 6, and with the rear wall 3 of the body 1 are assembled depending loop shaped hangers 12, the lowermost portions of which are connected by a horizontal platform 14. The platform 14 has bearings 15 in which castor frames 16 are mounted to turn, about vertical axes, the castor frames carrying pairs of castors 17, which support the barrow at its rear end.

On the platform 14 is secured a motor 18, preferably an internal combustion engine, although another kind of motor may be furnished. A horizontal exhaust pipe 19 is connected by securing elements 27 to the vertical rear portions of the hangers 12. A connection 20 leads from the intermediate portion of the exhaust pipe 19 to the motor 18. The starter shaft for the motor 18 is designated by the numeral 21, and carries a gear wheel 22 meshing with a segment 23 on a shaft 24 journaled in the motor frame. The shaft 24 has a downwardly and laterally inclined arm 25, carrying a pedal 26, located near to the right hand side of the machine, looking forwardly, as Figure 2 will show.

A housing 30 is located beneath the body 1 and is connected to the body 1 by a bracket 31. Within the housing 30 is disposed a driven shaft 32, which extends longitudinally of the barrow. A brake mechanism 62 is carried by the housing 30 and acts on the shaft 32. On the rear end of the shaft 32 there is a sprocket wheel 29. There is a sprocket wheel 28 on the shaft of the motor 18. The sprocket wheels 29 and 28 are connected by a sprocket chain 33.

Any suitable means may be provided whereby one of the grips 7 may be used to operate the brake mechanism 62, and whereby the other of the grips may be used to control the motor 18. As shown, but not of necessity, a shaft 36 (Figure 1) is mounted to rotate in the right hand handle bar 6. The shaft 36 is connected at its rear end to the corresponding grip 7. On the shaft 36 there is an inwardly extended arm 35 (Figure 2). The upper end of a link 34 is pivoted to the inner end of the arm 35. The lower end of the link 34 is operatively connected with the brake mechanism 62. By means of a shaft similar to the shaft 36, by means of an arm 37 on the said shaft, and by means of a link 48, the left hand grip 7 in Figure 2 may be connected with the motor or engine 18, to start and stop the same.

The differential mechanism is indicated at 39 and is carried by the housing 30. The differential mechanism 39 is operatively connected to the shaft 32. The transverse part of the differential mechanism 39 is connected to the bottom of the body 1 by supports 40, one of which is shown in Figure 3. The transverse shafts 41 of the differential mechanism are connected to the longitudinal shaft 32 in the usual way, the means for accomplishing this result being common, well known, and unworthy of specific delineation. On the ends of the shaft 41 of the differential mechanism are sprocket wheels 42, connected by sprocket chains 43 with sprocket wheels 44 on the axles 45 journaled in bearings 46 on the sides 4 of the body 1. Ground wheels 47 are secured to the sprocket wheels 44.

Through the instrumentality of the pedal 26, the arm 25, the segment 23, the gear wheel 22, and the shaft 21, the engine 18 may be put into operation. The shaft of the engine drives the sprocket wheel 28, and the sprocket chain 33, together with the sprocket wheel 29, imparts rotation to the longitudinal shaft 32. From the longitudinal shaft 32, the differential mechanism 39 transmits rotation to the sprocket wheels 42, by way of the transverse differential shaft sections 41. The sprocket wheel 42 drives the chains 43, the chains 43 operate the sprocket wheels 44, and the sprocket wheels 44 turn the ground wheels 47.

The brake mechanism 62 may be operated by a train of parts including the link 34, the arm 35 on the shaft 36 of Figure 1, the said shaft 36, and the corresponding grip 7. The engine 18 is controlled from the other grip 7, by a shaft, like the shaft 36, the arm 37, and the link 48 of Figure 2.

The general construction is such that heavy loads may be propelled in a barrow, without difficulty, by a single operator, and the operator can control the movement of the barrow with the same ease and facility that he would control an automobile or other motor propelled vehicle. The various parts of the device may be standard automobile parts, and the device, therefore, may be assembled readily without providing a large number of especially made elements.

Having thus described the invention, what is claimed is:—

1. A wheel barrow comprising a body, a ground wheel carried by the body, a motor, means for connecting the motor operatively with the ground wheel, handles projecting rearwardly from the body, hangers mounted on the handles and carrying the motor, and an exhaust outlet for the motor, the exhaust outlet being secured to the hangers, to serve as a connecting brace between the hangers.

2. A wheel barrow comprising a load-carrying body, a single pair of ground wheels supported for rotation at the sides of the body and located intermediate the front and rear ends of the body, a differential disposed underneath the body in substantially vertical alinement with the center of rotation of the ground wheels, the differential including transverse shafts and a rearwardly extending housing, means for suspending the differential from the body means extended upwardly from the transverse shafts of the differential for operatively connecting those shafts with the ground wheels, a longitudinal shaft journaled in the housing and operatively connected with the transverse shafts of the differential, a motor, means for supporting the motor on the barrow in a position behind the body, a driving connection between the motor and the longitudinal shaft, a brake mechanism carried by the housing and acting on the longitudinal shaft, the brake mechanism being located between the motor and the body, rearwardly extended handles carried by the body, means for operating the brake mechanism, and means for controlling the motor, both of said means being extended backwardly upon the handles within reach of a person holding the handles.

In testimony that we claim the foregoing as our own, we have hereto affixed our signatures.

JOE HOFFMAN.
HUGO HOFFMAN.